(12) United States Patent
Müller

(10) Patent No.: US 7,853,132 B2
(45) Date of Patent: Dec. 14, 2010

(54) ELECTRICALLY HEATABLE FLUID LINE

(75) Inventor: Dominic Müller, Nentershausen (DE)

(73) Assignee: Norma Germany GmbH, Maintal (DE)

( * ) Notice: Subject to any disclaimer, the term of this patent is extended or adjusted under 35 U.S.C. 154(b) by 174 days.

(21) Appl. No.: 11/977,955

(22) Filed: Oct. 26, 2007

(65) Prior Publication Data

US 2008/0101781 A1    May 1, 2008

(30) Foreign Application Priority Data

Oct. 27, 2006    (DE)    ............ 10 2006 051 413

(51) Int. Cl.
  *F24H 1/10*    (2006.01)
(52) U.S. Cl. ..................... 392/479; 392/503
(58) Field of Classification Search ............ 392/479, 392/503
  See application file for complete search history.

(56) References Cited

U.S. PATENT DOCUMENTS

| | | | | |
|---|---|---|---|---|
| 3,378,673 A | * | 4/1968 | Hopper | ............ 392/472 |
| 3,764,779 A | * | 10/1973 | Kadoya et al. | ............ 219/201 |
| 5,428,706 A | * | 6/1995 | Lequeux | ............ 392/472 |
| 7,203,419 B2 | * | 4/2007 | Malone et al. | ............ 392/468 |
| 7,555,349 B2 | * | 6/2009 | Wessman et al. | ............ 607/116 |

FOREIGN PATENT DOCUMENTS

| | | |
|---|---|---|
| DE | 39 00 821 | 4/1990 |
| DE | 202005004602 | 8/2005 |
| DE | 102005037183 | 5/2007 |

* cited by examiner

*Primary Examiner*—Thor S Campbell
(74) *Attorney, Agent, or Firm*—Lucas & Mercanti, LLP; Klaus P. Stoffel

(57) ABSTRACT

An electrical heatable fluid line includes an inner cross sectional area which surrounds a medium conducting duct, a heating conductor arrangement which is arranged in a thermally conductive connection with the inner cross sectional area, and an outer cross sectional area which surrounds the heating conductor arrangement between the inner cross sectional area and the outer cross sectional area an intermediate layer which separates the heating conductor arrangement from the outer cross sectional area and which mechanically has a lower stability than the inner cross sectional area and the outer cross sectional area.

8 Claims, 1 Drawing Sheet

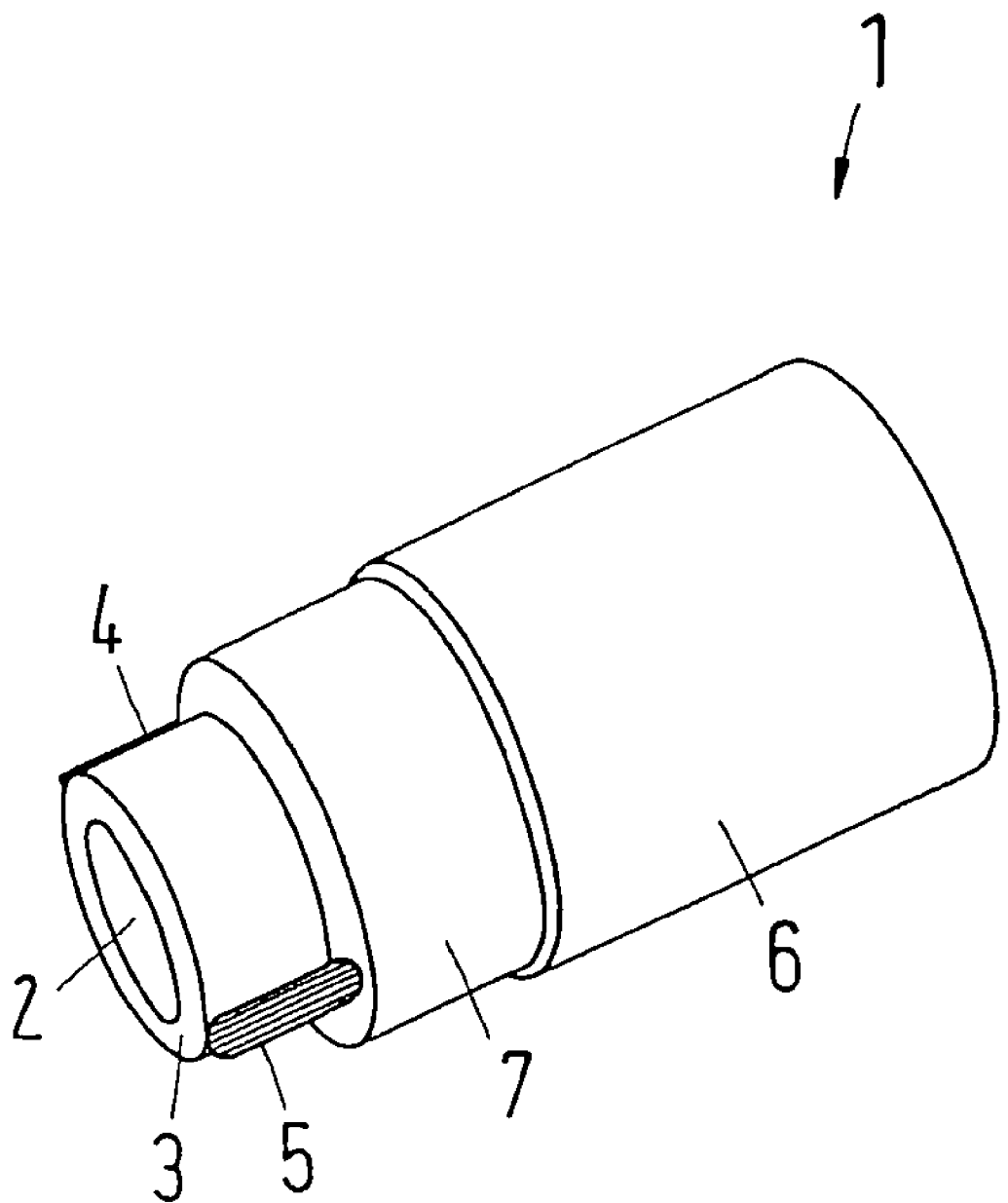

ELECTRICALLY HEATABLE FLUID LINE

BACKGROUND OF THE INVENTION

1. Field of the Invention

The present invention relates to an electrically heatable fluid line with an inner cross sectional area which surrounds a medium conducting duct, a heating conductor arrangement which is arranged in a thermally conductive connection with the inner cross sectional area, and an outer cross sectional area which surrounds the heating conductor arrangement.

2. Description of the Related Art

It is desirable in many cases to heat a fluid during its conveyance from a source to a user. Many types of these applications are conceivable. Only as an example, fluid lines should be mentioned which transport window washing liquid from a supply container to spray nozzles, or fluid lines used for transporting area in a motor vehicle having a diesel engine. Such electrically heatable fluid lines are known in the art. The inner cross sectional area must be constructed in such a way that it is resistant to the fluid conducted therethrough and which additionally permits heat to penetrate from the heating conductor arrangement into the medium-conducting duct. The outer cross sectional area serves as a mechanical protection for the heating conductor arrangement and in many other cases also has an electrical insulator.

Such a heating conductor arrangement is manufactured, for example, by constructing the inner cross sectional area, which is constructed as a pipeline, so as to be surrounded by the heating conductor arrangement. The heating conductor arrangement may be, for example, a helically wound winding or a network of heating wires. After the heating conductor arrangement has been mounted, a jacket is then arranged as an outer cross sectional area. An alternative is to manufacture the fluid line by an injection molding or extrusion process and to include the heating conductor arrangement as the fluid line is being molded.

A fluid line which meets the requirements of operation is obtained in both cases. However, it is cumbersome and/or necessary to have a certain skill for being able to configure such a heatable fluid line in such a way it can be supplied with electrical power.

Such a line is either produced with the necessary length, wherein the electrical conductors of the heating conductor arrangement are left exposed. This is a very complicated procedure. On the other hand, the fluid line can also be manufactured, so to speak endlessly. The required pieces are then cut to length from this endless fluid line. However, in this case, it is necessary to expose the heating conductor arrangement at least to such an extent that electrical contacts can be connected. For this purpose, it is necessary to sever the move out of the outer cross sectional area. A great risk in doing that is the fact that when the outer cross sectional area is removed the heating conductor arrangement is also damaged or even entirely severed.

SUMMARY OF THE INVENTION

Therefore, it is the primary object of the present invention to make simpler the manufacture of a connection to the heating conductor arrangement.

In an electrically heatable fluid line of the above-described type, this object is met by arranging between the inner cross sectional area and the outer cross sectional area an intermediate layer which separates the heating conductor arrangement form the outer cross sectional area and which mechanically has a lower stability than the inner cross sectional area and the outer cross sectional area.

As a result of the configuration according to the present invention, it is easily possible to sever the outer cross sectional area and to pull the outer cross sectional area from the end of the fluid line. The severing cut may actually be deeper than the thickness of the outer cross sectional area because the tool used for cutting does not contact the heating conductors of the heating conductor arrangement, but initially contacts the intermediate layer. After the outer cross sectional area has been cut, it can be easily pulled from the intermediate layer because the outer cross sectional area has a lower stability than the outer cross sectional area. It may be possible that the intermediate layer is partially destroyed which, however, is entirely acceptable. The intermediate layer can also be easily removed from the inner cross sectional area because it has a lower stability than the inner cross sectional area. As soon as the intermediate layer has been removed, the ends of the heating conductor arrangement are freely accessible. Under certain circumstances, the intermediate layer may already be removed when the outer cross sectional area is pulled off. In accordance with a preferred feature, the intermediate layer can be manually separated from the inner cross sectional area and the heating conductor arrangement. Consequently, the intermediate layer can be easily removed by a simple manipulation of a worker. No tools are required for removing the intermediate layer. It may be possible that the intermediate layer has already been removed when the outer cross sectional area is pulled off. In accordance with a preferred feature, the intermediate layer can be rubbed off. Accordingly, the worker can remove the intermediate layer by rubbing the intermediate layer with one or two fingers. This causes the intermediate layer to crumble, so that it can be removed from the inner cross sectional area and from the heating conductor arrangement. The materials used for the intermediate layer may be, for example, a material which is known from being used in electrical lines and which is known from electrical lines whose jacket of such an electrical line is severed form the insulation of the individual strands. Such a material used in the manufacture of electrical cables is also called a filling mixture or an "EPDM filling batch". The material may contain, for example, EPDM, chalk, aluminum-hydroxide, paraffin waxes, and hydrocarbon waxes.

The intermediate layer is preferably electrically insulating. This makes it possible to use the intermediate layer as an electrical insulator in order to keep small the danger to the environment in the vicinity of the fluid line cause by the electrical current or voltage.

It is preferred in this connection that the heating conductor arrangement is in electrical contact with the intermediate layer. When the intermediate layer is electrically insulating, the heating conductor arrangement also requires only electrically insulating wires, then the heating conductor arrangement also only requires blank wires which makes the manufacture cheaper.

In accordance with an alternative feature, the heating conductor arrangement has heating conductors with support of an insulating layer.

In accordance with a preferred feature, the intermediate layer is formed of a non-linked material. A non-linked material, for example, a synthetic material, can be shaped together with the materials of the inner cross sectional area and the outer cross sectional area to from a line. However, once the outer cross sectional area has been removed, this unlinked material can be removed piece by piece, so that the heating conductor arrangement becomes accessible at the ends thereof.

In accordance with a preferred feature, the material of the intermediate layer is selected from a group which includes silicon and rubber. An intermediate layer which is formed of one of these materials can be easily destroyed in the unlinked state and, thus, can be removed from the inner cross sectional area.

The inner cross sectional area is preferably constructed as a multiple layer area. This makes it possible in an easy manner to adapt the inner cross sectional area to the medium which is to be conducted through the duct.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

The single FIGURE of the drawing is a schematic perspective view of an electrically heatable fluid line.

DETAILED DESCRIPTION OF THE INVENTION

The drawing shows an electrically heatable fluid line 1 with a duct 2 through which a fluid can be conducted. The fluid is to be heated.

The duct 2 is surrounded by an inner cross sectional area 3 which can also simply be called the "inner layer". The inner cross sectional area 3 may be constructed as a single layer or with multiple layers. The configuration of the inner cross sectional area 3 or the inner layer depends primarily on the medium which is to be conducted through the duct 2.

A heating conductor arrangement with two heating conductors 4, 5 is arranged at the circumference of the inner cross sectional area 3. In the illustrated embodiment, the heating conductors 4, 5 are aligned parallel to the axis of the duct 2. However, they can also be arranged helically around the inner cross sectional area 3. It is also possible to provide more than the two illustrated heating conductors 4, 5.

The heating conductors 4, 5 are constructed of a material which has a certain ohmic resistance, so that heat is lost when an electrical current is conducted through the heating conductors 4, 5. In accordance with another advantageous feature, the heating conductors 4, 5 may be connected at the illustrated end to a source of electrical power. And the two heating conductors 4, 5 may be connected to one another at the other end of the fluid 1, so that a closed circuit is produced by the fluid line 1. Of course, it is also possible to connect each heating conductor 4, 5 at both ends to the electrical power source, so that it is not necessary to connect the two heating conductors 4, 5 to each other.

The two heating conductors 4, 5 may be blank, i.e., without their own insulation, or they may also be constructed with insulation.

The fluid line 1 has an outer cross sectional area 6 which can also be called the "outer layer". This outer layer or the outer cross sectional area 6 is supposed to have a mechanical stability which is sufficient for protecting the fluid line 1 against mechanical damage, for example, vibrations, falling rocks, etc.

An intermediate layer 7 is arranged between the inner cross sectional area 3 and the outer cross sectional area 6. The intermediate layer 7 has a lower mechanical stability than the outer cross sectional area 6 and the inner cross sectional area 3. The intermediate layer 7 is not glued to the inner cross sectional area 3 nor are the layers connected in some other material-connecting manner, so that, after the outer cross sectional area 6 has been removed, the intermediate layer 7 can be easily separated from the inner cross sectional area 3 and from the heating conductor arrangement 4, 5. This separation can be done manually by a worker by rubbing the intermediate layer 7.

Such a configuration significantly simplifies the manufacture of an electrically heatable fluid line. The required length of the fluid line 1 is cut from an essentially endlessly produced supply roll. Subsequently, a circumferential cut is made through the outer cross sectional area 6. This circumferential cut severs the outer cross sectional area 6 completely and the cut may even penetrate by a distance into the intermediate layer 7 because the intermediate layer 7 also ensures that a certain distance exists between the heating conductor arrangement 4, 5 and the outer cross sectional area 6. After the circumferential cut has been made, an end portion of the outer cross sectional area 6 can be pulled from the fluid line.

The intermediate layer 7 is now in the open. As mentioned above, this intermediate layer 7 is easily removed by rubbing. This causes the intermediate layer 7 to break up. For this purpose, the intermediate layer 7 is preferably of a non-linked material, particularly a synthetic material or a silicon or rubber. The material of the intermediate layer may be, for example, a combination of EPDM, chalk, aluminum-hydroxide, paraffin waxes, and hydrocarbon waxes. When the intermediate layer 7 is removed to a sufficient extent, as is the case, for example, in the drawing, the heating conductors 4, 5 are freely accessible, so that they can be connected to an electrical power source. It may sometimes be required in insulated heating conductors 4, 5 to remove the insulation. In that case, the intermediate layer may have to be removed to a somewhat greater extent than is illustrated in the drawing.

The intermediate layer 7 can be constructed so as to be electrically insulating. In that case, the heating conductors 4, 5 may be blank. Even when the heating conductors 4, 5 have their own insulation, the use of an insulating intermediate layer 7 may be advantageous.

The fluid line 1 may be constructed as a smooth pipe, an undulated pipe or as an injection molded pipe. The heating conductors 4, 5 can be arranged directly on the circumference of the inner cross sectional area 3. When the intermediate layer 7 has a sufficient thermal conductivity, the heating conductors 4, 5 may also have a smaller distance from the inner cross sectional area 3, wherein then the material of the intermediate layer 7 may be arranged in the inner cross sectional area 3.

The heating conductors 4, 5 may be extruded directly during the manufacture of the fluid line 1. As an alternative, the fluid line 1 can also be constructed in several successive steps.

The inner cross sectional area 3 may be, for example, of PA. The outer cross sectional area 6 may be formed of TPU. In that case, the intermediate layer 7 is held between the inner cross sectional area 3 and the outer cross sectional area 6, i.e., the intermediate layer 7 is held radially on the inside and the outside, so that the intermediate layer 7 is so stabled that it mechanically secures the heating conductors 4, 5, even when vibrations occur. The heating conductors 4, 5 are thus essentially resiliently mounted in the fluid line 1.

While specific embodiments of the invention have been shown and described in detail to illustrate the inventive principles, it will be understood that the invention may be embodied otherwise without departing from such principles.

I claim:

1. An electrically heatable fluid line comprising an inner cross sectional area surrounding a medium-conducting duct, a heating conductor arrangement arranged in a thermally conductive connection with the inner cross sectional area, and an outer cross sectional area surrounding the heating conductor arrangement, further comprising an intermediate layer arranged between the inner cross sectional area and the outer cross sectional area, wherein the intermediate layer separates the heating conductor arrangement, from the outer cross sectional area, and wherein the intermediate layer has a mechanically lower stability than the inner cross sectional area and the outer cross sectional area, wherein the intermediate layer is provided so that it can be rubbed off the inner cross sectional area by a user's fingers.

2. The fluid line according to claim 1, wherein the intermediate layer and the inner cross sectional area and the heating conductor arrangement are separable manually.

3. The fluid line according to claim 1, wherein the intermediate layer is electrically insulating.

4. The fluid line according to claim 3, wherein the heating conductor arrangement is in electrical contact with the intermediate layer.

5. The fluid line according to claim 1, wherein the heating conductor arrangement comprises heating conductors provided with an insulating layer.

6. The fluid line according to claim 1, wherein the intermediate layer is of an unlinked material.

7. The fluid line according to claim 6, wherein the material of the intermediate layer is collected from a group consisting of silicon and rubber.

8. The fluid line according to claim 1, wherein the inner cross sectional area 3 is a multiple layer area.

* * * * *